(No Model.)
A. L. MILLS.
NUT LOCK WASHER.
No. 505,839.
Patented Oct. 3, 1893.
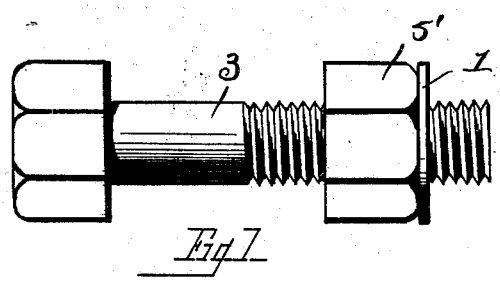
Fig.1.
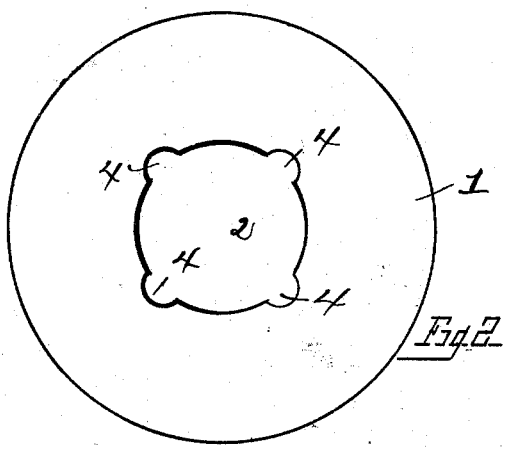
Fig.2.
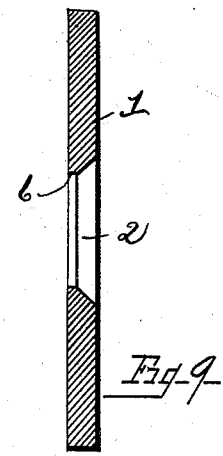
Fig.9.
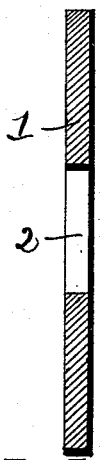 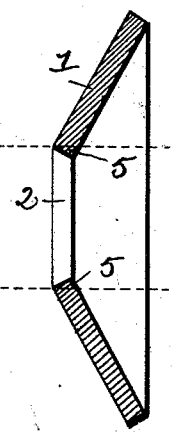 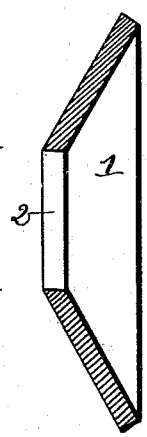  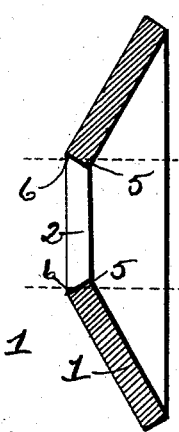 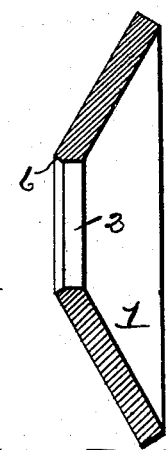
Fig.3.  Fig.4.  Fig.5.  Fig.6.  Fig.7.  Fig.8.
WITNESSES
Carroll J. Webster.
Floyd R. Webster.
INVENTOR
Arthur L. Mills
By William Webster
atty

UNITED STATES PATENT OFFICE.

ARTHUR L. MILLS, OF TOLEDO, OHIO, ASSIGNOR TO THE TOLEDO NUT LOCK COMPANY, OF OHIO.

NUT-LOCK WASHER.

SPECIFICATION forming part of Letters Patent No. 505,839, dated October 3, 1893.

Application filed January 31, 1893. Serial No. 460,210. (No model.)

*To all whom it may concern:*

Be it known that I, ARTHUR L. MILLS, of Toledo, county of Lucas, and State of Ohio, have invented certain new and useful Improvements in Nut-Lock Washers; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a nut lock washer, and has for its object to provide a washer having a central orifice and a circumferential convexity therefrom radially, with the wall of the orifice on a plane parallel with the periphery of the bolt, so that when the washer is placed upon the top of the nut with the apex of the convex side resting thereon, and then forced to a plane parallel with the face of the top of the nut, the wall of the orifice will have an inclination of sixty degrees, or co-incident with the pitch of the thread of the bolt, to cause the wall to rest in the groove of the thread, and to cut obliquely into the same when resting at right angles to the bolt, thereby securing greater holding capacity, and avoiding the upsetting of the metal of the washer as the wall of the orifice contracts.

With these objects in view the invention consists broadly in a conical washer having a central orifice to fit the bolt and the wall of the orifice either entirely or partially upon a plane parallel with the periphery of the bolt, when the washer is dished, so that when the washer is flattened, either the entire wall or a portion of the thickness shall be of an angle co-incident with the pitch of the thread, and the edge of the wall adapted to enter the groove of the thread when parallel, and to cut into the same when oblique.

In the drawings: Figure 1 is a plan view of a bolt having a nut locked thereon by my improved washer. Fig. 2 is a plan view of the washer flattened. Fig. 3 is an edge view of one half of a washer when flattened, showing the wall of the orifice of the same thickness of the washer. Fig. 4 is a sectional edge view of a washer when dished, showing in dotted lines the angle of the wall to a plane parallel with the periphery of the bolt. Fig. 5 is a like view with the wall of the orifice properly trimmed. Fig. 6 is an edge view of one half the washer with the wall of the orifice trimmed, showing the angle of the wall when the washer is flattened. Fig. 7 is a sectional edge view of the washer when dished, showing by dotted lines a portion of the angle of the wall to be removed to trim the major portion of the wall to a plane parallel with the periphery of the bolt. Fig. 8 is a like view with the wall of the orifice properly trimmed. Fig. 9 is an edge view of one half of the washer, when flattened, with a portion of the wall of the orifice on a pitch co-incident with the pitch of the thread.

Heretofore in the use of a washer in locking the nut upon a bolt, the wall of the washer has been of a thickness to span the threads, and as a consequence, the effect has been to upset the metal of the wall of the orifice, rather than to cause the same to contract and enter the groove of the thread when parallel therewith, and to embed in the metal of the thread when oblique. This feature has resulted in simply a mutilation of the thread, and an undue enlargement of the orifice.

I have discovered that by trimming the wall of the orifice, when dished, so that the wall is wholly or partially on a plane parallel with the periphery of the bolt, the effect will be to form a wall to the orifice with an angle of the same degree as the pitch of the thread, and thereby cause the wall to enter the groove of the threads, when parallel, and to cut into the same when oblique, when the wall is contracted by flattening the washer, thereby insuring a firm hold upon the bolt without mutilating the threads. In distorting the metal in dishing the same, the metal will fracture at a given point of distortion, and therefore the expansion of the diameter of the orifice is in a ratio with the amount of concavity given the metal. By my invention there is a larger orifice at the same distortion, and a consequent greater contraction of the metal upon the bolt.

In carrying out my invention I employ a washer 1 having a central orifice 2 of less diameter than the bolt 3 upon which it is to be placed, and then dish the washer to expand the wall of the orifice, the wall being preferably formed with semi-circular recesses 4 to assist in the proper expansion, after which I trim the edge of the wall, taking therefrom either all the metal 5 that is forced to an angle with the periphery of the bolt, as shown in Figs. 4, 5 and 6, or nearly all of the metal 5 of the angle, as shown in Figs. 7, 8, and 9, to form an angle to the wall, when the washer is flattened upon the top of the nut 5' that shall co-incide with the pitch of the thread, and cause the wall to enter the groove of the thread when parallel, and cut into the threads when oblique thereto.

The modification shown in Figs. 7, 8, and 9 is for a washer in use upon a bolt having exceedingly coarse threads, in which the square portion 6 of the edge of the wall will seat in the groove, and the angled portion co-incident with the thread.

A convenient means for trimming the angle of the wall of the orifice is to provide a punch of the correct diameter, to trim the desired amount of the angle, and force the same through the metal as the washer is dished.

In operation, the washer is placed upon the bolt, with the apex upon the top of the nut, and the washer is flattened to a plane parallel with the face of the nut, when the wall of the orifice will enter the groove of the thread, and cut into the oblique portions as the wall contracts, thereby securing the washer firmly, a result that could not be attained were the wall of the washer of the same thickness as the body portion as shown in Fig. 3.

What I claim is—

A nut lock washer having a central orifice normally smaller than the bolt, expanded by dishing the same to fit the bolt, the wall of the orifice of the washer being formed with an inclination coinciding with the pitch of the thread of the bolt when the washer is flattened.

In testimony that I claim the foregoing as my own I hereby affix my signature in presence of two witnesses.

ARTHUR L. MILLS.

Witnesses:
WILLIAM WEBSTER,
CARROLL J. WEBSTER.